Nov 2, 1937.       G. E. McPHERREN       2,097,933
SYNCHRONIZING APPARATUS
Filed Feb. 20, 1937
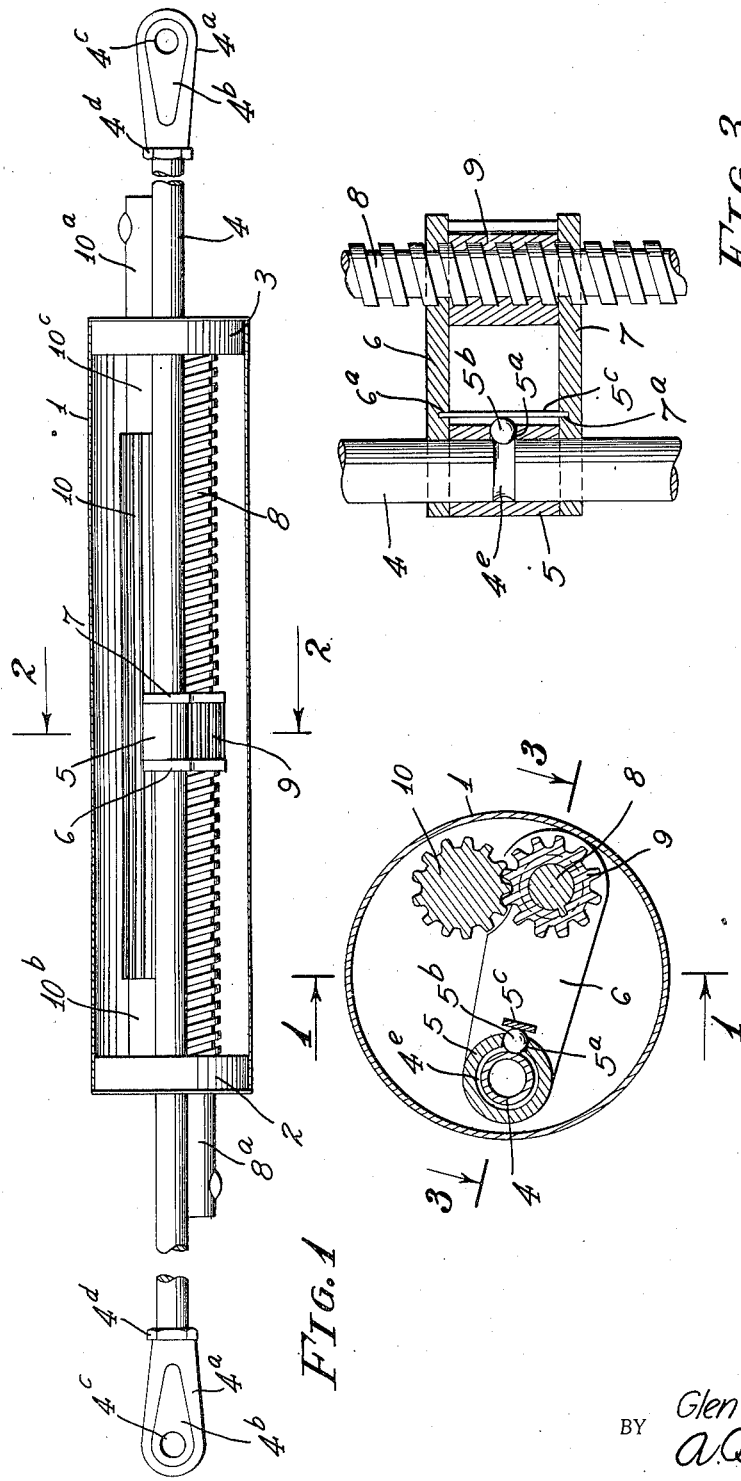
INVENTOR.
Glen E. McPherren
BY A.B. Bowman
ATTORNEY.

Patented Nov. 2, 1937

2,097,933

UNITED STATES PATENT OFFICE 2,097,933

SYNCHRONIZING APPARATUS

Glen E. McPherren, San Diego, Calif., assignor of one-half to Philip Taber, San Diego, Calif.

Application February 20, 1937, Serial No. 126,788

7 Claims. (Cl. 74—395)

My invention relates to an apparatus for synchronizing mechanical structures such as engines or the like, and the objects of my invention are:

First, to provide an apparatus for automatically synchronizing two or more different operating machines;

Second, to provide an apparatus of this class which is particularly adapted for synchronizing two or more engines that form the power plant for aircraft or the like;

Third, to provide an apparatus of this class which tends to shift one mechanism into higher or lower speed relatively to another when said mechanisms are out of synchronization, thus automatically keeping them synchronized;

Fourth, to provide an apparatus of this class which is applicable for use in connection with practically any kinds of operating mechanisms used in unison;

Fifth, to provide an apparatus of this class which may be readily applied in connection with unison mechanism now in use for synchronizing the same;

Sixth, to provide an apparatus of this class which is positive and definite in its action; and Seventh, to provide an apparatus of this class which is very simple and economical of construction, efficient in its action, easy to apply, durable, and which will not readily deteriorate or get out of order.

With these and other objects in view, as will appear hereinafter, my invention consists of certain novel features of construction, combination, and arrangement of parts and portions, as will hereinafter be described in detail, and particularly set forth in the appended claims, reference being had to the accompanying drawing and to the characters of reference thereon, which form a part of this application, in which:

Figure 1 is a side elevational view of a fragmentary portion of my synchronizing apparatus, showing the casing in section along the line 1—1 of Figure 2; Figure 2 is a transverse sectional view of the apparatus along the line 2—2 of Figure 1, on an enlarged scale; and Figure 3 is a fragmentary longitudinal sectional view along the line 3—3 of Figure 2, showing some of the parts and portions in elevation to facilitate the illustration.

Similar characters of reference refer to similar parts and portions throughout the several views of the drawing.

The tubular casing 1, casing end members 2 and 3, shift rod 4, shift rod sleeve 5, links 6 and 7, screw member 8, short gear member 9, and long gear member 10, constitute the principal parts and portions of my synchronizing apparatus.

The casing member 1 is a hollow tubular member of suitable length. Secured in one end is an end member 2, which is preferably of sufficient width to provide bearings for the members extending therethrough and it is secured in the end of the casing member 1 in any way desired. The end member 3 is similar to the end member 2 and is similarly secured. Mounted in these members 2 and 3 and extending through the casing 1 is the shift rod 4, which has bearings in the members 2 and 3. It is provided on its extended ends with coupling members 4a for connection with the throttle of an engine for shifting the throttle for increasing or decreasing the speed, the coupling members being conventional and providing a flat surface 4b on the upper and lower sides, and with a hole therethrough 4c for receiving a bolt for connection with another coupling member not shown. These coupling members are preferably screw threaded on the ends of the rod 4 and secured by lock nuts 4d. Mounted intermediate the ends of the rod 4 is a sleeve member 5, which sleeve member is provided with a hole 5a in one side which is adapted to receive ball member 5b which rests at its inner side in a groove 4e in the rod 4, shown best in Figure 3 of the drawing, and this ball member is held in position by means of a spring bar 5c, which is secured at its opposite ends in slots 6a and 7a in the link members 6 and 7, shown best in Figure 3 of the drawing. It will be noted that the rod 4 is preferably hollow to lighten it. It will also be noted that this rod 4 shifts longitudinally in the end members 2 and 3. Revolubly mounted in these end members 2 and 3 at its opposite ends is the screw 8, the ends forming the journal for said screw. One end of this screw extends through the member 2, which provides an extended shaft 8a, which is connected with a tachometer shaft of one of the engines or other operating shafts for determining the speed. Mounted on the screw member 8 is a gear member 9 which is screw-threaded internally and adapted to fit on the screw threads of the screw member 8 and shift longitudinally thereon in either direction, dependent upon the relative speeds of the members 8 and 9. The gear member 9 is interposed between the extended ends of the link members 6 and 7 and revoluble therebetween, so that with the shifting of the gear member 9 on the screw member 8, the links 6 and 7 are shifted, carrying with them the rod 4. It will be here noted that the links 6 and 7 and sleeve member 5 are rigidly connected together forming a rigid connecting yoke. This gear member 9 meshes with a relatively long gear member 10 which is also revolubly mounted in the end members 2 and 3 and journalled thereby, and this gear member 10 is provided with an extended shaft 10a which is adapted to be coupled with a tachometer shaft of another engine or other speed or revolving mechanism. The member 10 is provided with toothless portions 10b and 10c, so that in case one mechanism runs considerably faster than the other without control, the gear 9 will run to the end and out of mesh with the gear 10 and therefore it will have no further movement. This is to provide for emergency.

The operation of my synchronizing apparatus is as follows: One of the coupling members 4a is secured to the throttle of an engine and the other coupling member is connected with a manual control. Then the members 8 and 10 are coupled with the tachometer shaft of the engines or other revolving mechanism. In case one engine is running faster than the other, the screw member 8 will carry the gear member 9 longitudinally along the screw member 8, which carries with it the yoke formed of the links 6 and 7 and the sleeve 5, together with the shiftable rod 4, which varies the speeds of the engine or other mechanism synchronizing it with the other engine.

In case it is desired to operate manually, the member 4 may be shifted in either direction relatively to the yoke and gears 8 and 9. By sufficient pressure on the manual control lever not shown but which may connect with either end of the rod 4, the bar member 5b will move the spring 5c outwardly so that the bar member will leave the groove 4e permitting the relative shifting of the member 4 manually.

Though I have shown and described a particular construction, combination, and arrangement of parts and portions, I do not wish to be limited to this particular construction, combination and arrangement, but desire to include in the scope of my invention the construction, combination, and arrangement substantially as set forth in the appended claims.

Having thus described my invention, what I claim as new and desire to secure by Letters Patent is:

1. In a synchronizing apparatus, a pair of spaced journal members, a shift rod, shiftably mounted longitudinally in said journal members, a long gear member positioned parallel with said shift rod journaled in said journal members and having a shaft extending from one end thereof, a screw member parallel with said long gear member journaled in said journal members with an extended shaft extending in the opposite direction from the extended shaft of said gear member, a short gear screw threaded on said screw member and meshing with the other gear member, and means connecting said short gear member with said shift rod.

2. In a synchronizing apparatus, a pair of spaced journal members, a shift rod, shiftably mounted longitudinally in said journal members, a long gear member positioned parallel with said shift rod journaled in said journal members and having a shaft extending from one end thereof, a screw member parallel with said long gear member journaled in said journal members with an extended shaft extending in the opposite direction from the extended shaft of said gear member, a short gear screw threaded on said screw member and meshing with the other gear member, means connecting said short gear member with said shift rod, and a casing secured to said journal members and enclosing said gears.

3. In a synchronizing apparatus, a pair of spaced journal members, a shift rod, shiftably mounted longitudinally in said journal members, a long gear member positioned parallel with said shift rod journaled in said journal members and having a shaft extending from one end thereof, a screw member parallel with said long gear member journaled in said journal members with an extended shaft extending in the opposite direction from the extended shaft of said gear member, a short gear screw threaded on said screw member and meshing with the other gear member, and means connecting said short gear member with said shift rod, coupling means secured on the extended ends of said shift rod.

4. In a synchronizing apparatus, a pair of spaced journal members, a shift rod, shiftably mounted longitudinally in said journal members, a long gear member positioned parallel with said shift rod journaled in said journal members and having a shaft extending from one end thereof, a screw member parallel with said long gear member journaled in said journal members with an extended shaft extending in the opposite direction from the extended shaft of said gear member, a short gear screw threaded on said screw member and meshing with the other gear member, means connecting said short gear member with said shift rod, and a casing secured to said journal members and enclosing said gears, coupling means secured on the extended ends of said shift rod.

5. In a synchronizing apparatus, a longitudinally shiftable rod, coupling means mounted on the opposite ends of said rod, a short gear on a parallel axis with said rod intermediate its ends, a yoke supporting said gear in certain relation with said rod, a screw member parallel with said rod upon which said short gear is screw threaded, provided with a coupling at one end for engagement with a mechanism to be synchronized, a long gear meshing with said short gear, provided with a coupling extending in the opposite direction from the other coupling member for engagement with another mechanism to be synchronized.

6. In a synchronizing apparatus, a longitudinally shiftable rod, coupling means mounted on the opposite ends of said rod, a short gear on a parallel axis with said rod intermediate its ends, a yoke supporting said gear in certain relation with said rod, a screw member parallel with said rod upon which said short gear is screw threaded, provided with a coupling at one end for engagement with a mechanism to be synchronized, a long gear meshing with said short gear, provided with a coupling extending in the opposite direction from the other coupling member for engagement with another mechanism to be synchronized, journals for said shift rod, screw member and long gear positioned toward their opposite ends.

7. In a synchronizing apparatus, a longitudinally shiftable rod, coupling means mounted on the opposite ends of said rod, a short gear on a parallel axis with said rod intermediate its ends, a yoke supporting said gear in certain relation with said rod, a screw member parallel with said rod upon which said short gear is screw threaded, provided with a coupling at one end for engagement with a mechanism to be synchronized, a long gear meshing with said short gear, provided with a coupling extending in the opposite direction from the other coupling member for engagement with another mechanism to be synchronized, journals for said shift rod, screw member and long gear positioned toward their opposite ends, and a casing secured to said journal members and enclosing said shift rod, screw member and long gear member.

GLEN E. McPHERREN.